United States Patent [19]
Lang

[11] Patent Number: 5,345,124
[45] Date of Patent: Sep. 6, 1994

[54] CONNECTING COVER FOR ELECTRIC FUEL PUMP

[75] Inventor: Harald Lang, Markgroeningen, Fed. Rep. of Germany

[73] Assignee: Robert Bosch GmbH, Stuttgart, Fed. Rep. of Germany

[21] Appl. No.: 1,813

[22] Filed: Jan. 8, 1993

[30] Foreign Application Priority Data

Jan. 21, 1992 [DE] Fed. Rep. of Germany ....... 9200625

[51] Int. Cl.$^5$ .................. H02K 5/24; H02K 11/00; H02K 5/12; H02K 13/06
[52] U.S. Cl. .................. 310/51; 310/68 R; 310/71; 310/87; 310/220
[58] Field of Search .......... 310/51, 68 R, 71, 72, 310/68 C, 87, 89, 220, 221, 238, 239; 417/423.14, 423.7

[56] References Cited

U.S. PATENT DOCUMENTS

| | | | |
|---|---|---|---|
| 4,329,605 | 5/1982 | Angi et al. | 310/68 R |
| 4,342,934 | 8/1982 | van Wijhe et al. | 310/239 |
| 4,845,393 | 7/1989 | Burgess et al. | 310/51 |
| 4,900,966 | 2/1990 | Winter et al. | 310/239 |
| 5,196,750 | 3/1993 | Strobl | 310/239 |
| 5,231,321 | 7/1993 | Takaguchi | 310/51 |
| 5,243,247 | 9/1993 | Schmidt | 310/68 R |

FOREIGN PATENT DOCUMENTS

| | | | |
|---|---|---|---|
| 0175993 | 4/1986 | European Pat. Off. | 310/238 |
| 2239132 | 6/1991 | United Kingdom | 310/239 |

Primary Examiner—Steven L. Stephan
Assistant Examiner—Clayton E. LaBalle
Attorney, Agent, or Firm—Michael J. Striker

[57] ABSTRACT

A connecting cover for a pump housing of an electric fuel pump, which pump housing accommodates a direct current motor has a cover body having a cover axis and brush guides arranged radially with respect to the cover axis and provided for guiding commutator brushes, connecting plugs projecting from the outer side of the cover body, connecting lances which connect the connecting plugs electrically with the brushes, a screening unit for screening spark interferences of the commutator brushes. The screening unit includes at least one condensor provided with two connecting wires. The body has a bottom with axially projecting ribs which form a pocket for receiving the capacitor. The capacitor has a first connecting wire abutting against one of the brush guides and a second connecting wire for contacting the pump housing or a pole pipe of the direct current motor and extending outwardly on a periphery of the body.

6 Claims, 4 Drawing Sheets

CONNECTING COVER FOR ELECTRIC FUEL PUMP

BACKGROUND OF THE INVENTION

The present invention relates to connecting covers for electric fuel pumps.

More particularly, it relates to a connecting cover for placing on a pump housing of an electric fuel pump which pump housing accommodates a direct current motor.

Such connecting covers for electric fuel pumps usually carry a hydraulic connecting pipe which forms a pressure side of the electric fuel pump. They serve on the one hand for fluid-tight closing of the pump housing after mounting of the motor inside the housing and on the other hand also as a bearing point for the rotor of the direct current motor and receive the brush holder with corresponding connecting plugs for the network connection.

Direct current motors must be spark screened against the so-called brush fires occurring on the current switching or commutator brushes. In a known connecting cover of the above mentioned type at least one capacitor is arranged on the end of the plug lugs. After soldering of its one connecting wire to one plug end and its another connecting wire to a mass contact it is injection molded during producing of the closing cover. This involves high manufacturing expenses, longer axial opening of the connecting cover, and first of all a long electrical connection path between interference source and the screening means which influence the quality of the screening.

SUMMARY OF THE INVENTION

Accordingly, it is an object of the present invention to provide a connecting cover of the above mentioned general type, which avoids the disadvantages of the prior art.

In keeping with these objects and with others which will become apparent hereinafter, one feature of the present invention resides, briefly stated, in a closing cover of the above mentioned type, in which the capacitor is received in a pocket which is formed between two axially projecting ribs of the cover bottom, and its first connecting wire abuts against one brush guide while its second connecting wire for contacting the pump housing or a pole pipe of the direct current motor extends outwardly on the cover periphery.

When the connecting cover is designed in accordance with the present invention, it has the advantage that at least one capacitor is located near the interference source and is connected with the commutator brush through a short first connecting wire directly, while its second connecting wire is guided over the shortest path on the pump housing or on the pole pipe of the direct current motor. Due to this shortening of the electrical connection path between the interference source (commutator brush) and the screening means (capacitor), the screening efficiency is substantially improved. The ribs on the cover bottom which form the receiving pocket for the capacitor are utilized for the reinforcement of the connecting cover and also provide for the possibility of exchanging the capacitor. The length size of the connecting cover can be retained smaller than in the case of injection molding of the capacitor with the cover material.

It is conventional to use additional chokes for an improved screening. In accordance with a preferable embodiment of the invention each choke is clamped between the connecting lugs in the interior of the cover, and one connecting lug is mounted on the brush guide while the other connecting lug is connected with a mass contact. The capacitor with its first connecting wire together with the choke end is fixed on one connecting lug, for example by welding. Whether this connecting wire is then clamped on the connecting lug located in the current direction before or behind the choke depends on the degree of interference of the direct current motor.

In accordance with a preferable embodiment of the invention both connecting lugs are arranged in the longitudinal direction of the choke opposite to one another and respectively near a choke end and the ribs of the capacitor receiving pocket are located under the choke. In this embodiment the second connecting wire of the capacitor is guided in the region between both connecting lugs of the choke on the cover periphery for contacting the pole pipe of the direct current motor or the pump housing. On the other hand, the second connecting wire can be guided through a passage provided for receiving the brush guide in the cover edge and on the cover periphery, to abut against the pole pipe or a pump housing during insertion of the connecting cover.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
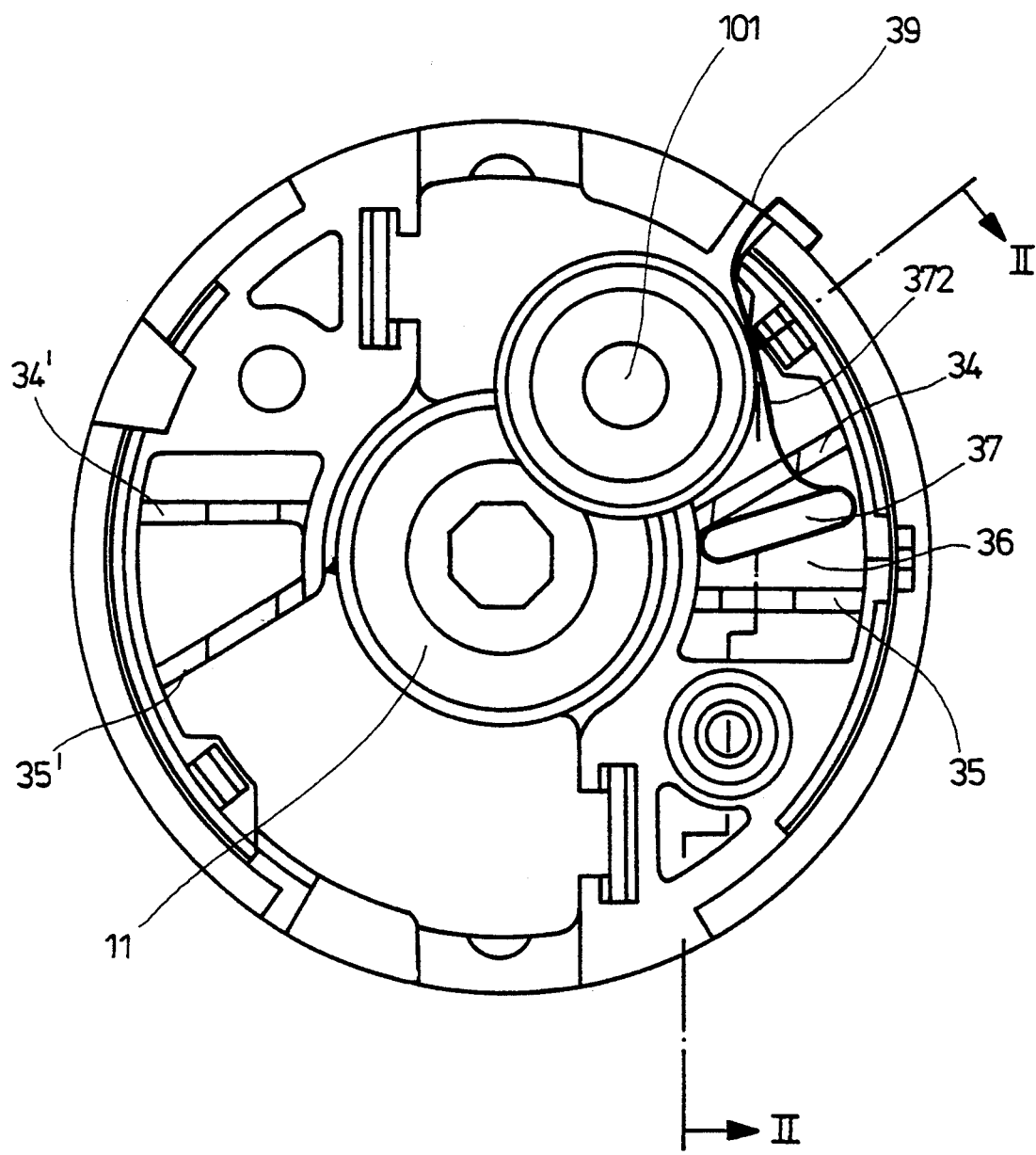
FIG. 1 is a plan view of a connecting cover for an electric fuel pump, and particularly of its inner side facing a pump housing, without a screening capacitor.
Figure 2:
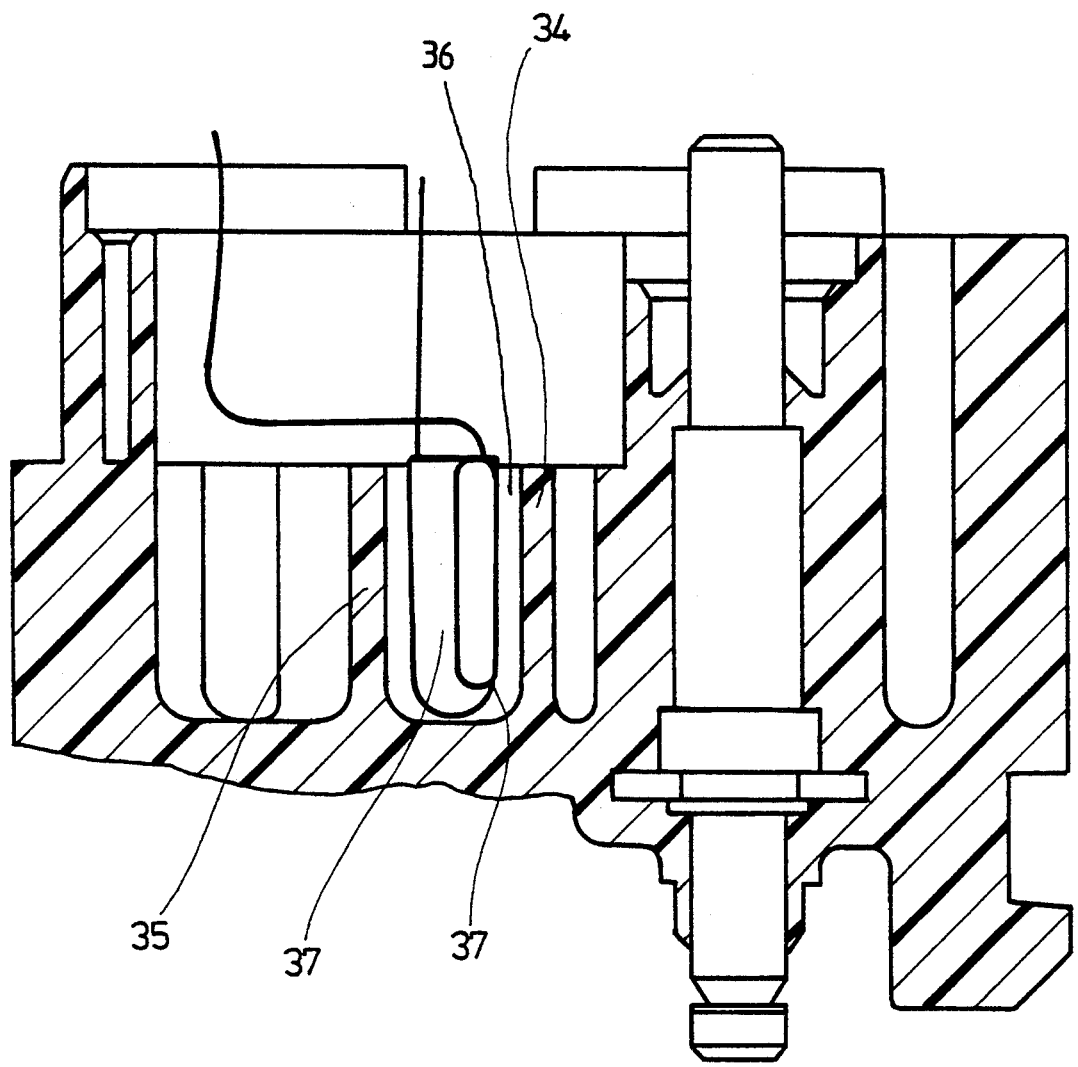
FIG. 2 is a view showing a section taken along the line II—II in FIG. 1.
Figure 3:
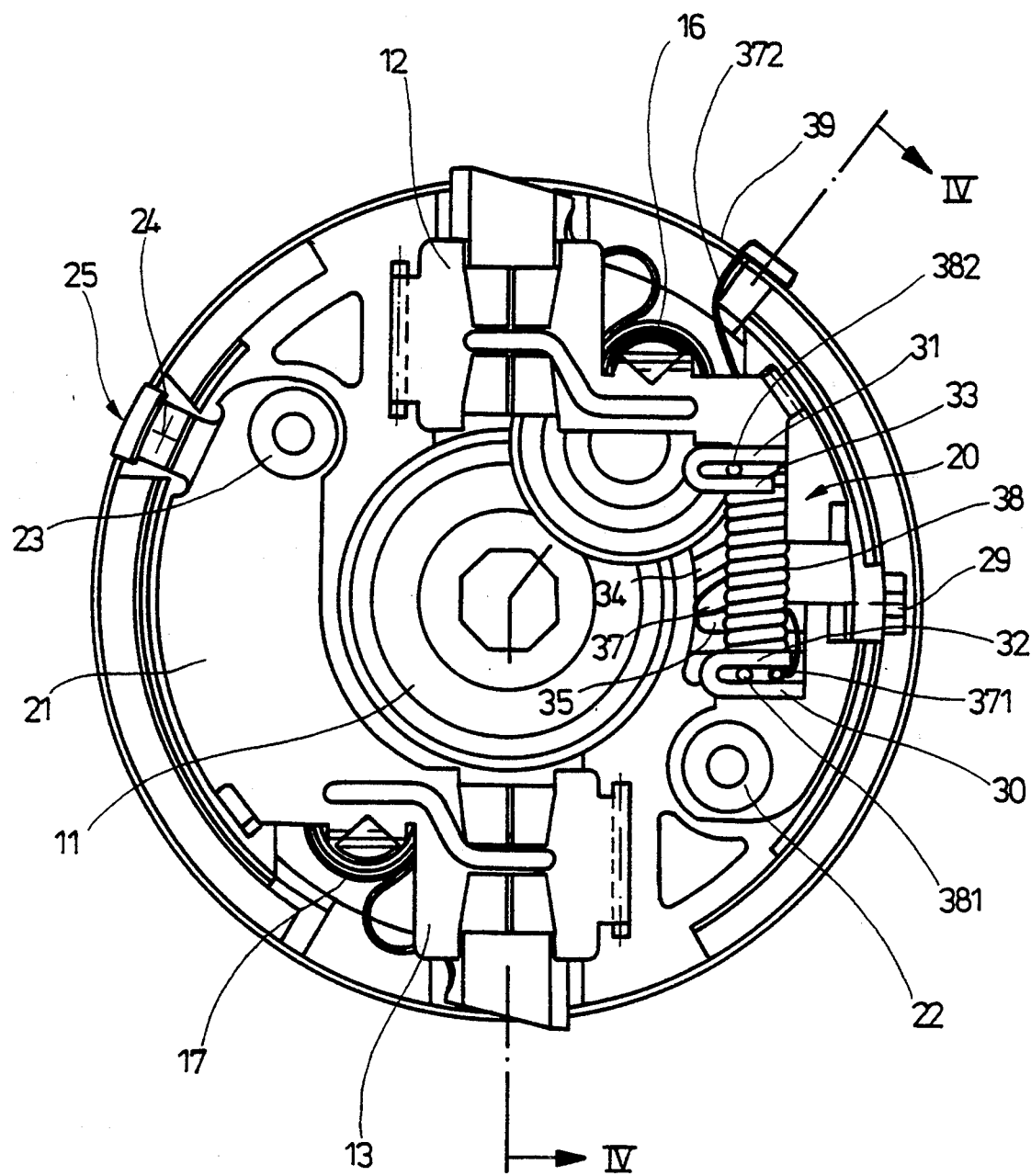
FIG. 3 is view substantially corresponding to the view of FIG. 1, but showing the completely equipped connecting cover.
Figure 4:
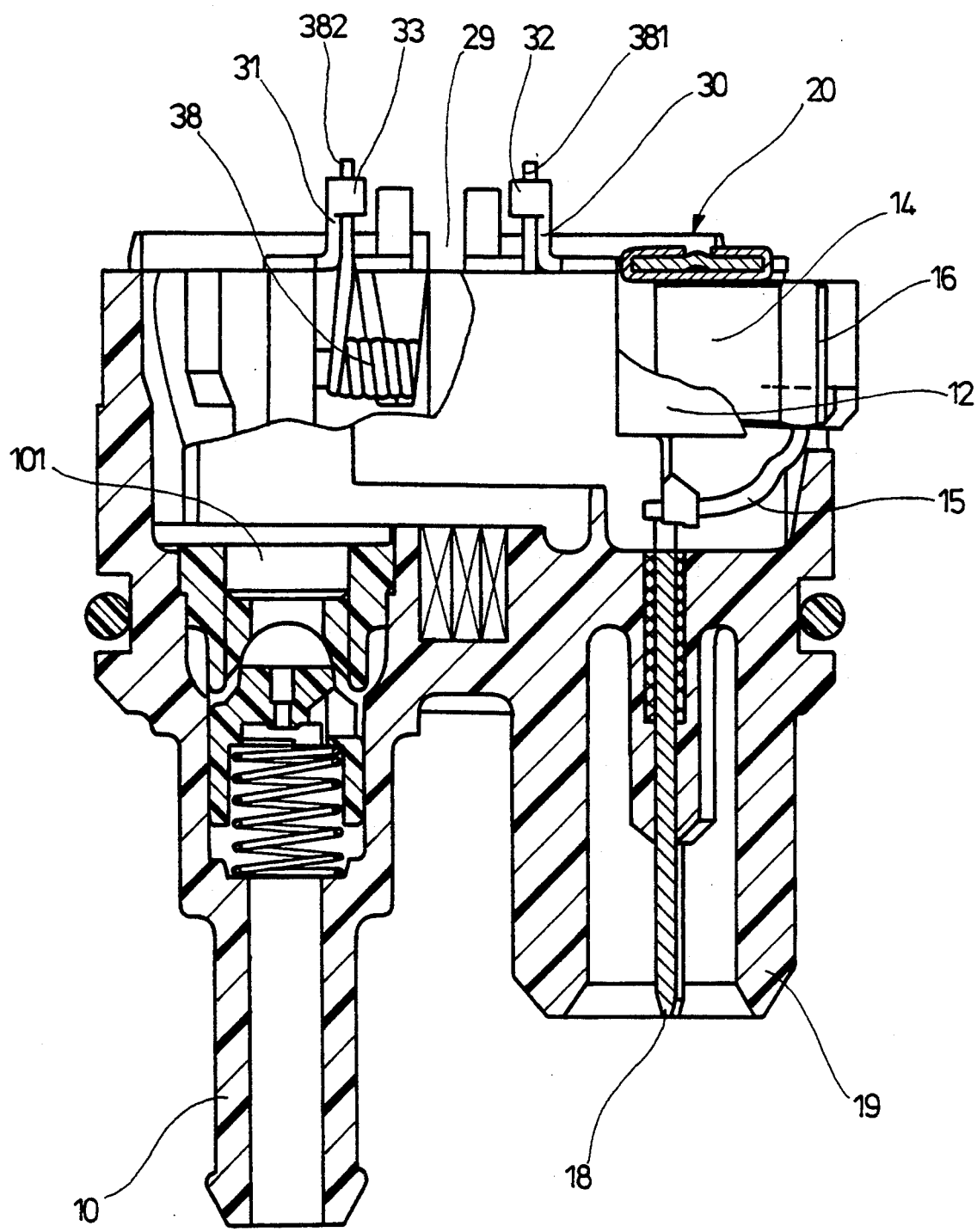
FIG. 4 is a view showing a section taken along the line IV—IV in FIG. 3.

A cap-shaped connecting cover which is shown in FIG. 1 in not equipped state, in FIG. 3 in equipped state, and in FIGS. 2 and 4 in section, is used for an electric fuel pump. More particularly, it closes an end side of a pump housing of the electric fuel pump in which a direct current for circulating a fuel is provided.

The connecting cover has a hydraulic connecting pipe 10 shown in FIG. 4. It communicates with the interior of the pump housing through an opening 101. The connecting cover moreover has a bearing 11 for the rotor of the direct current motor. After insertion of the cap-shaped connecting cover in the pump housing the ring-shaped cap edge abuts against the inner wall of the pump housing and the free shaft end of the rotor shaft of the direct current motor extends in the bearing area 11. The commutator, collector and current switch are arranged on the rotor shaft and located inside the connecting cover.

As can be seen from FIG. 3, the connecting cover has two brush guides 12 and 13 which are arranged radially with respect to the cover axis. They are located diametrically opposite one another on the commutator of the direct current motor. A current switching or commutator brush, identified hereinbelow as a carbon brush 14 is axially displaceably guided in each brush guide 12 and 13 as shown in FIG. 4. Each carbon brush 14 is pressed by a brush pressing spring 16 or 17 shown in FIG. 3 against the commutator of the direct current motor by its end side. Each carbon brush 14 is connected through a connecting lance 15 with one of two connecting plugs 18 in an electrically conductor manner. Both connecting plugs 18 which are located one near the other project axially at the outer side of the connecting cover facing away of the pump housing. They are enclosed by a plug housing 19 which is formed of one piece with the connecting cover at a certain distance. Only one connecting plug is shown in FIG. 4.

The brush guides 12 and 13 are bent from electrically conductive material, for example bronze. They are projecting in ring-shaped sheet segments 20 and 21 of one piece with them. The sheet segments extend perpendicularly from the brush guides 12 and 13 along a part of the contour line of the connecting plug. Both sheet segments 20 and 21 are located opposite to one another. At the end which is spaced from the brush guide, the sheet segments 20 and 21 are anchored axially in a wall projection of the connecting cover, for example by hollow rivets. This is identified in FIG. 3 with reference numerals 22 and 23. A bracket 24 extends perpendicularly from the left sheet segment 21 in FIG. 3 and is bent by 90° so as to abut on the outer periphery of the connecting cover. The bracket 24 forms a mass contact which during insertion of the connecting cover of the pump housing contacts the latter.

The direct current motor is spark screened in a conventional manner. The screening means used for this include conventional chokes and capacitors. For connecting the screening means the right sheet segment 20 shown in FIG. 3 is radially separated and two connecting lugs 30 and 31 are bent in an axial direction from the sheet segment 20 as can be seen from FIG. 4. The connecting lugs 30 and 31 carry at their upper end U-shaped clamps 32 and 33 formed by bending of a sheet part. Two ribs 34 and 35 axially project between both connecting lugs 30 and 31 at the bottom of the connecting cover as shown in FIGS. 1 and 2. The ribs 34 and 35 extend substantially V-shaped relative to one another and are oriented substantially radially. A same arrangement of ribs 34' and 35' is provided on the cover bottom diametrically to the ribs 34 and 35 as can be seen in FIG. 1.

A capacitor 37 with two connecting wires 371 and 372 is inserted in a pocket 36 which is formed by the ribs 34 and 35 as shown in FIGS. 1 and 2. A choke 38 is held above the capacitor 37 between the connecting lugs 30 and 31. The choke 38 is fixed in the clamps 32 and 33 with its choke ends 381 and 382. The first connecting wire 371 of the capacitor 37 is fixed together with a throttle end 381 in the U-clamp 32 of the connecting lug 30 as shown in FIG. 3. The second connecting wire 372 of the capacitor 37 abuts through an edge opening 39 in the connecting cover on the outer surface of the connecting cover. During insertion of the connecting cover into the pump housing, the second connecting wire 372 contacts with the pump housing so that the capacitor 37 is connected with the mass over the shortest path.

Alternatively, the first connecting wire 371 together with the choke end 382 can be fixed on the connecting lug 31 by the U-clamp 33. Which of the connecting lugs 30 and 31 is used for clamping the first connecting wire 371 of the capacitor 37 depends on the degree of interference of the motor. Alternatively, the second connecting wire 372 of the capacitor 37 can be guided also in the region between both connecting lugs 30 and 31 on the surface of the connecting cover. For this purpose it is guided in a recess 29 which is formed during by the radial separation of the sheet segments 20. In this case the second connecting wire 372 is guided to the pole pipe of the direct current motor or to the pump housing.

For obtaining an improved screening efficiency, it is advantageous to provide the above described screening means namely the capacitor 37 and the choke 38 for each carbon brush 14. The same arrangement as the arrangement with the brush guide 12 can be provided for the brush guide 13. For this purpose it is also necessary to separate the left sheet segment 21 in FIG. 3 in the above described manner for forming the connecting lugs with U-clamps. The arrangement and the electrical connection of the capacitor and throttle is performed in the same manner as described above. A sufficient screening or as known to experts a "complete screening" is also obtained by two chokes with only one capacitor.

It will be understood that each of the elements described above, or two or more together, may also find a useful application in other types of constructions differing from the types described above.

While the invention has been illustrated and described as embodied in a connecting cover, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connecting cover for a pump housing of an electric fuel pump, which pump housing accommodates a direct current motor, comprising a cover body having a cover axis and brush guides arranged radially with respect to said cover axis and provided for guiding commutator brushes; connecting plugs projecting from the outer side of said cover body; connecting lances which connect said connecting plugs electrically with said brushes; screening means for screening spark interferences of the commutator brushes, said screening means including at least one capacitor provided with two connecting wires; said cover body having a bottom with axially projecting ribs which form a pocket for receiving said capacitor, said capacitor being located near said brush guides, said brush guides being formed from electrically conductive material, said at least one capacitor having a first connecting wire connected directly with one of said brush guides and a second connecting wire for contacting the pump housing or a pole pipe of the direct current motor and extending outwardly on a periphery of said body.

2. A connecting cover as defined in claim 1, wherein said body has an edge for inserting said one brush guide, said connecting wire of said capacitor being guided through a passage on said periphery of said body.

3. A connecting cover for a pump housing of an electric fuel pump, which pump housing accommodates a direct current motor, comprising a cover body having a cover axis and brush guides arranged radially with respect to said cover axis and provided for guiding commutator brushes; connecting plugs projecting from the outer side of said cover body; connecting lances which connect said connecting plugs electrically with said brushes; screening means for screening spark interferences of the commutator brushes, said screening means including at least one capacitor provided with two connecting wires; said body having a bottom with axially projecting ribs which form a pocket for receiving the capacitor, said capacitor having a first connecting wire abutting against one of said brush guides and a second connecting wire for contacting the pump housing or a pole pipe of the direct current motor and extending outwardly on a periphery of said body; and a first connecting lug arranged on said one brush guides and a second connecting lug connected with a mass contact located on a periphery of said cover body, said screening means having at least one choke with one end connected with said first connecting lug and another end connected with said second connecting lug, said first connecting wire of said capacitor together with said second end of said choke being clamped on one of said connecting lugs.

4. A connecting cover as defined in claim 3, wherein said connecting lugs are located opposite to one another in a longitudinal direction of said choke and near choke ends, said ribs being located under said choke for receiving said capacitor.

5. A connecting cover as defined in claim 3, wherein said second connecting wire of said capacitor is located in a region between both connecting plugs on the periphery of said body.

6. A connecting cover for a pump housing of an electric fuel pump, which pump housing accommodates a direct current motor, comprising a cover body having a cover axis and brush guides arranged radially with respect to said cover axis and provided for guiding commutator brushes; connecting plugs projecting from the outer side of said cover body; connecting lances which connect said connecting plugs electrically with said brushes; screening means for screening spark interferences of the commutator brushes, said screening means including at least one capacitor provided with two connecting wires; said body having a bottom with axially projecting ribs which form a pocket for receiving the capacitor, said capacitor having a first connecting wire abutting against one of said brush guides and a second connecting wire for contacting the pump housing or a pole pipe of the direct current motor and extending outwardly on a periphery of said body, said screening means also including two throttles, each of said brush guides being provided with a connecting lug, each of said throttles being associated with a respective one of said brush guides with said brush, and said capacitor being associated with one of said brush guides with said brush.

* * * * *